Jan. 29, 1924.
H. H. JOHNSTON
SYSTEM OF CONTROL
Filed April 12, 1921
1,481,908
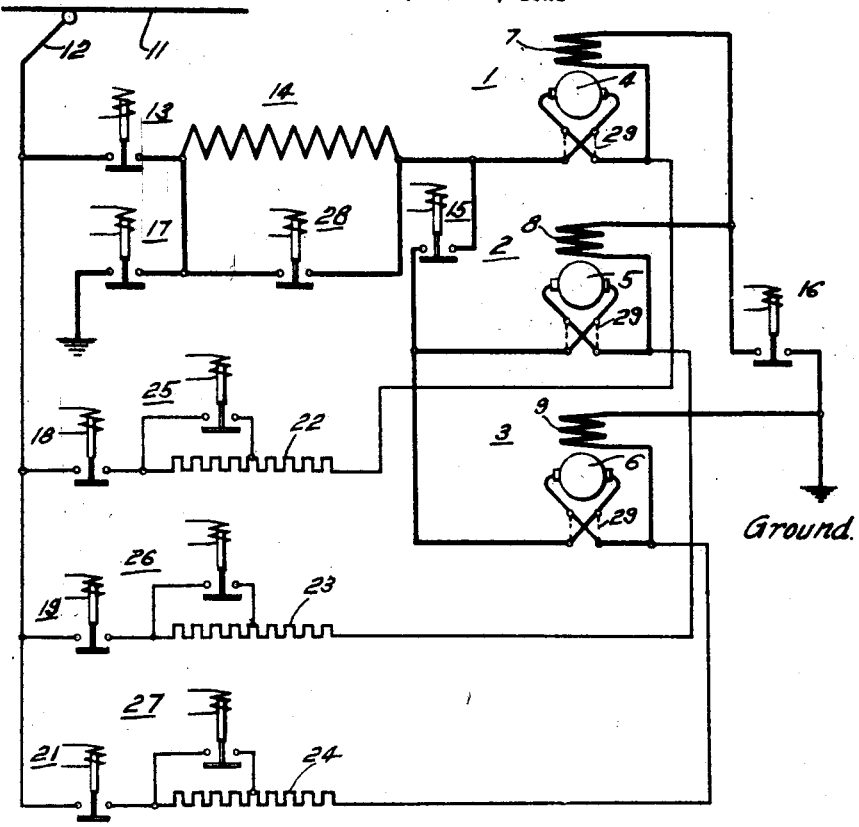
Fig.1.
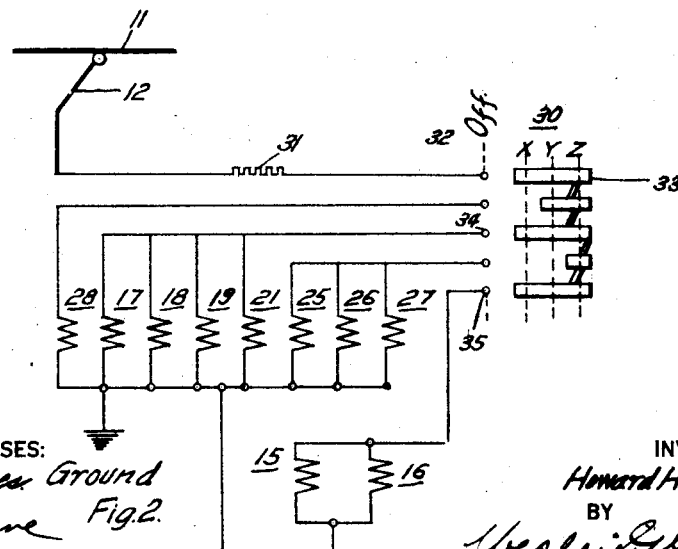
Fig.2.
WITNESSES:
INVENTOR
Howard H. Johnston.
BY
ATTORNEY Patented Jan. 29, 1924.

1,481,908

UNITED STATES PATENT OFFICE.

HOWARD H. JOHNSTON, OF EDGEWOOD, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

Application filed April 12, 1921. Serial No. 460,790.

*To all whom it may concern:*

Be it known that I, HOWARD H. JOHNSTON, a citizen of the United States, and a resident of Edgewood, in the county of Allegheny and State of Pennsylvania, have invented a new and useful Improvement in Systems of Control, of which the following is a specification.

My invention relates to motor-control systems and it has particular relation to control systems for vehicles equipped with a plurality of driving motors, such, for example, as mining locomotives.

The object of my invention is to provide a control system for a plurality of motors that shall ensure effective and positive dynamic braking thereof, regardless of the speed at which they are operating.

Heretofore, dynamic braking of a motor has been effected by reversing the relation of the armature to the field-magnet winding and connecting both in a closed circuit comprising a resistor. In such a system, as the speed of the motor diminishes, the value of the current decreases and the energization of the field-magnet winding is lessened. The value of the current may be maintained for a time by shunting portions of the resistor that is connected in series relation with the armature and field-magnet winding of the motor; but, after the resistor has been completely shunted, the value of the current through the field-magnet winding may no longer be maintained, if the speed of the armature is decreased. Because of the low degree of energization of the field-magnet windings, dynamic braking becomes difficult when the motors are operated at a relatively low speed.

A second difficulty encountered in effecting dynamic braking of a plurality of motors is the tendency of one or more of the motors to act as generators and the remaining motors to be energized thereby. To avoid this latter difficulty, change-over switches have previously been employed to connect the armature of each motor to the field-magnet winding of a different motor, thereby equalizing the braking action of the motors. With three or more motors, this set of connections becomes quite complicated and requires a considerable number of switches. On mining locomotives, as it is desirable to limit the equipment to as few parts as possible, it is advantageous to eliminate these changeover switches.

Briefly speaking, my invention consists in providing a control system rendering it unnecessary to employ change-over switches for effecting dynamic braking of a plurality of motors and in maintaining the energization of the field-magnet windings of the motors at a relatively great value, even though the motors are operating at a relatively low speed.

For a better understanding of my invention, reference may be made to the accompanying drawing, Figure 1 of which is a schematic view of a motor-control system for governing a plurality of motors, in accordance with my invention, and Fig. 2 is a diagrammatic view of the auxiliary or control circuits for governing the switches or contactors shown in Fig. 1, Referring to Fig. 1 of the drawing, a plurality of motors 1, 2 and 3 are provided with armatures 4, 5 and 6, respectively, and series field-magnet windings 7, 8 and 9, respectively. When the motors 1, 2 and 3 are operating in series relation, they are energized by a circuit that extends from a source of electrical energy, such as a trolley 11, through a trolley-pole 12, line switch or circuit-breaker 13, starting resistor 14, armature 4 and series field-magnet winding 7 of the motor 1, series field-magnet winding 8 and armature 5 of the motor 2, and armature 6 and series field-magnet winding 9 of the motor 3 to the negative supply conductor, ground.

The motors 1, 2 and 3 may be connected in parallel relation by a plurality of parallel contactors 15 and 16. When the motors 1, 2 and 3 are employed for dynamic braking, a contactor 17 is employed for connecting one terminal of the starting resistor 14 to ground. During dynamic braking, the field-magnet windings 7, 8 and 9 of the motors 1, 2 and 3, respectively, may be connected to the source of energy or trolley 11 independently of the armatures 4, 5 and 6, by means of the contactors 18, 19 and 21, respectively. During dynamic braking a plurality of resistors 22, 23 and 24 are connected in series relation with the field-magnet windings 7, 8 and 9, of the motors 1, 2 and 3, respectively. A plurality of contactors 25, 26 and 27 are employed for shunting portions of the field resistors 22, 23 and 24, respectively, thereby increasing the energization of the corresponding field-magnet windings 7, 8 and 9 of the motors 1, 2 and 3, respectively, during dynamic braking.

An accelerating contactor 28 is provided for shunting the starting resistor 14 during acceleration of the motors 1, 2 and 3 and also during dynamic braking. Each of the motors 1, 2 and 3 is provided with a reverser 29 for changing the electrical relation of the armatures 4, 5 and 6 to their corresponding field-magnet windings 7, 8 and 9. The reversers 29 are employed to effect reverse operation of the motors 1, 2 and 3 to effect dynamic braking.

Referring to Fig. 2 of the drawing, a controller 30 having an "off" position, a plurality of operating positions, which for the sake of clearness, are not shown, and a plurality of dynamic braking positions $x$, $y$ and $z$, is employed to govern the main control system shown in Fig. 1. It is considered unnecessary to describe, in detail, the method of accelerating three motors by connecting them first in series relation and subsequently in parallel relation.

When the master controller 30 is actuated to its first dynamic-braking position, or position $x$, an auxiliary circuit is established from the trolley 11, through auxiliary resistor 31, contact terminal 32 of the master controller 30, contact segment 33, contact terminal 34 and the parallel-connected actuating coils of the contactors 17, 18, 19 and 21, to ground.

A second circuit is also established from the contact segment 33 of the master controller 30, through contact terminal 35 and the parallel-connected actuating coils of the contactors 15 and 16, to ground. When the contactors 16, 18, 19 and 21 are closed, the field-magnet windings 7, 8 and 9 of the motors 1, 2 and 3, respectively, are connected in parallel relation, the one to the other, and in series relation with the corresponding field resistors 22, 23 and 24.

When the contactors 15, 16 and 17 are closed, a dynamic-braking circuit comprising the contactor 17, starting resistor 14, parallel contactors 15 and 16, the armatures 4, 5 and 6 and the field-magnet windings 7, 8 and 9 of the motors 1, 2 and 3, respectively, is established.

Upon the speed of the motors 1, 2 and 3 being diminished, the master controller may be actuated to position $y$, causing the accelerating contactor 28 to close, thereby shunting the starting resistor 14 and thus increasing the value of the current through the armatures 4, 5 and 6 and field-magnet windings 7, 8 and 9 of the motors 1, 2 and 3, respectively. This increased value of current will increase the dynamic-braking action of the motors 1, 2 and 3.

It is apparent, that, while only one accelerating contactor 28 for shunting the starting resistor 14 is shown, in actual practice, a larger number would be employed but, in order to avoid unnecessary complication, they have been omitted. It is also to be understood that a plurality of overload relays could be employed, if desired, in the control system to prevent excessive values of current during dynamic braking.

When the speed of the motors 1, 2 and 3 becomes so diminished that there is insufficient dynamic-braking effort, the operator may increase such braking effort of the motors 1, 2 and 3 by actuating the master controller to position $z$, thereby causing the field contactors 25, 26 and 27 to close and thus shunt portions of the field resistors 22, 23 and 24, respectively, in this way increasing the energization of the field-magnet windings 7, 8 and 9 of the motors 1, 2 and 3.

While only a single contactor has been shown for shunting each of the field resistors 22, 23 and 24, in actual practice it would be desirable to employ a greater number of contactors and thus secure a larger number of dynamic-braking steps.

A suitable portion of each of the resistors 22, 23 and 24 is maintained permanently in series relation with the corresponding field-magnet windings 7, 8 and 9 of the motors 1, 2 and 3, respectively, during dynamic braking, to prevent a short-circuit from the trolley 11 through the field-magnet windings 7, 8 and 9 to ground.

While I have shown my invention in a preferred form, it is apparent that minor modifications may be made in the arrangement of circuits and apparatus employed without departing from the spirit of my invention. I desire, therefore, to be limited only by the scope of the appended claims.

I claim as my invention:

1. In a motor-control system, the combination with a plurality of motors, each of said motors having an armature and a field-magnet winding, of a source of electrical energy, and individual contactor means for simultaneously connecting the winding of each of said motors to said source and in a dynamic braking circuit with the armatures of said motors.

2. In a motor-control system, the combination with a plurality of motors, each of said motors having an armature and a field-magnet winding, of an external source of electrical energy, means for simultaneously connecting said windings to said source and in series relation with the armature of one of said motors during dynamic braking and means for independently varying the energization of each said windings from said external source during dynamic braking.

3. The method of effecting dynamic braking of a series motor having an armature and a field-magnet winding that comprises first energizing said winding from an external source of energy, said armature and winding being connected in a closed circuit independent of said source and having a translating device having a relatively high resistance value in series relation with said armature circuit and lastly increasing the energization of said winding, from said external source.

4. The method of effecting dynamic braking of a motor having an armature and a series field-magnet winding that comprises first energizing said winding from an external source of energy and placing a resistor in series relation with said armature and said winding in a circuit independent of said source, then shunting portions of said resistor, and lastly increasing the energization of said winding, from said external source.

5. The method of effecting dynamic braking of a series motor having an armature and a series field-magnet winding that comprises first energizing said winding from an external source of energy and placing a resistor in series relation with said armature and said winding to constitute a dynamic braking circuit, then shunting portions of said resistor and lastly increasing the energization of said winding from said external source upon said resistor being entirely shunted.

6. In a motor-control system, the combination with a plurality of motors, each of said motors having an armature and a field-magnet winding, of means for connecting said motors in series and in parallel relation, means co-operating with said first means for connecting said motors and said windings in a dynamic braking circuit and for independently and variably energizing each of said windings from a source of energy which is independent of the armatures of said motors.

7. In a motor-control system, the combination with a plurality of motors, each of said motors having an armature and a field-magnet winding, of means for connecting said motors in series and in parallel relation, means comprising a plurality of contactors for respectively energizing said windings independently of said armatures during dynamic braking and means comprising a plurality of contactors for connecting said armatures in parallel relation during dynamic braking.

8. In a motor-control system, the combination with a plurality of motors, each of said motors having an armature and a field-magnet winding, of means comprising a resistor for accelerating said motors, means for connecting the armatures of said motors in series and in parallel relation, means for energizing said motors, means comprising a contactor and a resistor for connecting each of said windings to said energizing means during dynamic braking, means for connecting said armatures in parallel relation the one to the other during dynamic braking, and means for shunting portions of each of said resistors during dynamic braking.

9. In a motor-control system, the combination with three motors having armatures and field-magnet windings, of means for connecting said motors in series and in parallel relation, a source of electrical energy, means comprising a plurality of contactors for connecting said windings to said source during dynamic braking, and means connecting said armatures in a dynamic braking circuit.

10. In a motor-control system, the combination with three motors, each of said motors having an armature and a field-magnet winding and a plurality of contactors for connecting said motors in series and in parallel relation, of means comprising a contactor and a resistor for connecting said armatures in a dynamic-braking circuit, means for shunting said resistor, means for energizing said windings independently of said armatures during dynamic braking and means for varying the energization of said windings during dynamic braking.

11. In a motor-control system, the combination with a motor having an armature and a series field-magnet winding, of means for connecting said armature and said winding in a dynamic-braking circuit, means independent of said armature for energizing said winding, and means for varying the energization of said winding, without directly varying the value of the current traversing said armature.

12. In a motor-control system, the combination with a motor having an armature and a series field-magnet winding, of means for connecting said armature and said winding in a closed circuit, means independent of said armature for energizing said winding and a plurality of resistance devices in circuit with said armature and said winding to vary the energization thereof.

In testimony whereof, I have hereunto subscribed my name this 30th day of March 1921.

HOWARD H. JOHNSTON.